United States Patent
Sims et al.

[11] 3,718,968
[45] March 6, 1973

[54] METHOD FOR CONNECTING A WIRE TO A COMPONENT

[75] Inventors: S. Donald Sims, Huntington; Raymond W. Forestieri, Greenlawn, both of N.Y.

[73] Assignee: The United States of America as represented by the United States Atomic Energy Commission

[22] Filed: Feb. 14, 1969

[21] Appl. No.: 799,469

[52] U.S. Cl. ..........................29/482, 29/488, 29/497, 219/121
[51] Int. Cl.............................B23k 1/20, B23k 31/02
[58] Field of Search........29/475, 482, 628, 488, 484, 29/497; 219/121 EB, 121 L

[56] References Cited

UNITED STATES PATENTS

| 3,125,803 | 3/1964 | Rich | 29/482 |
| 3,294,951 | 12/1966 | Olson | 219/121 EB |
| 3,340,601 | 9/1967 | Garibotti | 219/121 EB |
| 3,351,733 | 11/1967 | Tomono et al. | 219/121 EB |
| 3,418,442 | 12/1968 | Roy | 29/628 X |
| 3,435,520 | 4/1969 | Copeland | 29/628 |

Primary Examiner—John F. Campbell
Assistant Examiner—Richard Bernard Lazarus
Attorney—Yuter & Fields

[57] ABSTRACT

The method comprises deforming the end of the wire as by heating it above the melting point with a laser beam and permitting it to solidify into a sphere to raise the vaporization point of the end. The wire is placed into contact with the component and the wire and the component are heated by a laser beam to provide a fusion weld.

7 Claims, 5 Drawing Figures

}

PATENTED MAR 6 1973

INVENTORS
S. Donald Sims
Raymond W. Forestieri

BY *Yuter & Spiecens*
ATTORNEYS

METHOD FOR CONNECTING A WIRE TO A COMPONENT

This invention relates generally to a method of connecting a wire to a component and, more particularly, relates to a method for welding together a wire and a component without loss or destruction of the material forming the wire.

The fabrication of micro-miniature or micro-module circuit elements present serious problems particularly in the terminal connection area wherein a wire is connected to a component or substrate. Laser techniques have been investigated as a means for quickly and efficiently welding together the wire and substrate. However, serious problems have been encountered in adapting laser devices to such uses.

To be more specific, the wire has a much smaller volume than the substrate and, accordingly, the temperature of the wire rises at a much faster rate than the temperature of the substrate when they are subjected to the heat energy of the laser beam. In most cases the wire is heated above the vaporization or boiling point before the substrate reaches the melting point. Thus, the material of the wire is lost from the weldment and undercutting or complete material destruction results. In any case, this action may result in a relatively high resistance to current flow at the weldment, which may render the component unfit for its intended use.

Accordingly, an object of this invention is to provide an improved method for connecting a wire to a component or a substrate.

Another object of the invention is to provide a fusion welding method which is specifically adapted for use in conjunction with sub-miniature or micro-module components.

A further object of the invention resides in the novel steps which provide a method as described above in which a wire is joined to a substrate without any deleterious effects to the wire.

Accordingly, the method of the present invention comprises heating a preselected portion of a wire to deform the portion to lower the rate of temperature rise of the portion. The portion is then placed into contact with a contact zone on a component. The deformed portion and the contact zone are heated together to provide a fusion weld.

Accordingly, a feature of the invention is to change the temperature rise characteristic of the wire forming the weldment by deforming the same.

Other features and advantages of the present invention will become more apparent from a consideration of the following detailed description when taken in conjunction with the accompanying drawing, in which.

It is believed that the following discussion will facilitate an understanding of the method of the present invention.

Figure 1:
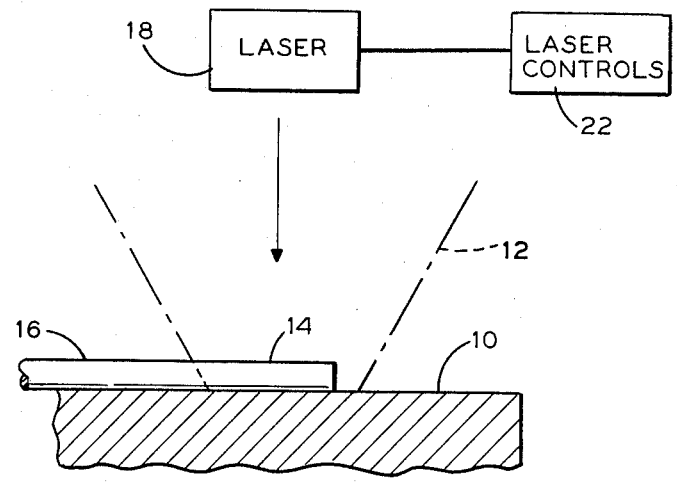
FIG. 1 is a front elevational view illustrating the location of the wire and component with respect to the laser device, to an enlarged scale.
Figure 2:
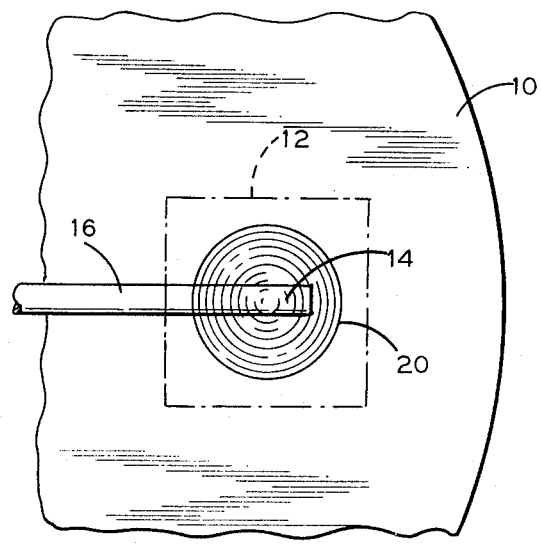
FIG. 2 is a top elevational view thereof.

Accordingly, in the type of fusion welding process under consideration a substrate or component 10 (FIGS. 1 and 2) is provided with a contact zone 12. The end 14 of a wire 16 is placed into contact with the substrate 10 in the contact zone and a laser beam from a laser device 18 is focused to a small spot 20 on the wire end 14 in the contact zone 12 by an appropriate focusing apparatus. The laser controls 22 are operated until the energy absorbed from the laser beam causes the volume of materials forming the weldment to completely melt. The melted materials then mix to form the fusion weld.

In view of the fact that both the wire and the substrate are optically opaque, the light energy from the laser device 18 can be absorbed only at the surface of the particular material. Thus, the factors determining the heating of a volume of the materials under consideration up to or above the melting point include thermal conduction from the surface of the particular material and convection within the molten pool. However, if the temperature of any of the materials is heated above the boiling or vaporization point of that particular material, the volume so heated will be lost from the weldment with consequent undercutting, drilling or complete material destruction resulting. This latter consideration becomes critical in the fusion welding of fine wires (for example, wires having a diameter of one mil) to a substrate.

To be more specific, the wire 16 may be considered to be thermally isolated from the substrate 10 albeit it is in contact with it is view of the short period of time the laser energy is applied and the fact that normally the wire and the substrate are separated by an oxide layer. Since the wire 16 is relatively thin the conduction losses down the remainder of the wire from the heated region will be relatively small and the temperature of the end 14 will rise at a relatively rapid rate.

On the other hand, the contact zone 12 of the substrate 10 is connected to a large thermal mass (i.e., the remainder of the substrate, which is much larger than the contact zone 12). Hence, the temperature of the substrate 10 will rise at a relatively slow rate as compared to the rate of temperature rise of the wire 16.

Figure 3:
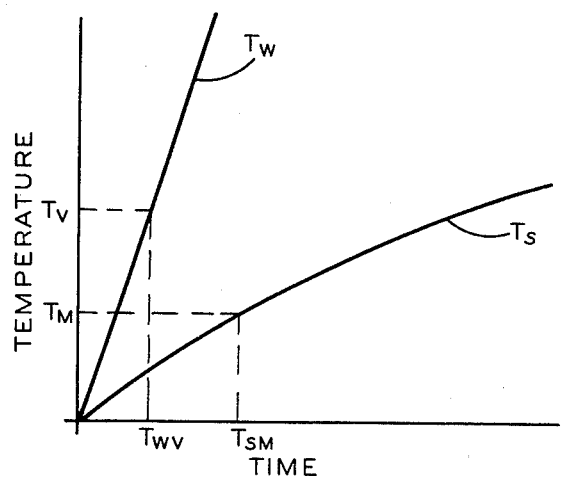
FIG. 3 is a graph illustrating typical temperature rise characteristics of a component or substrate and a wire.

The above situation is graphically depicted in FIG. 3 which shows the temperature rise of the wire and the substrate as a function of time for the same amount of heat energy supplied. Thus, the line $T_W$ represents the temperature rise characteristic of the wire 16 and the line $T_S$ represents the temperature rise characteristic of the contact zone 12 of the substrate 10.

In order to obtain a good fusion weld, both the wire 16 and the substrate 10 (i.e., the contact zone 12 of the substrate 10) must be heated above the melting point. As shown in the characteristics of FIG. 3, the period of time $T_{WV}$ for the end 14 of the wire 16 to reach the vaporization temperature $T_V$ is much smaller than the time interval $T_{SM}$ for the substrate 10 to reach the melting point $T_M$. This is due to the much larger slope of the line $T_W$, as noted above. Consequently, the wire end 14 will vaporize before the contact zone 12 of the substrate 10 melts and sufficient material removal probably will occur so as to destroy the wire and, concomitantly, the weld.

The temperature rise in the end 14 of the wire 16 is given by the equation $$T_W = T_1(1 - e^{-t/\zeta})$$

where:

$T_1$ is the final steady-state temperature (which is never reached within the time duration of the laser pulse); and $\zeta$ is a time constant determined by the material properties and the geometry.

As noted above, conduction losses in the wire end 14 are negligible and the above expression may be approximated by the relation $$T_W = (P_d \, r \, A_w)/(C_p \zeta V_w) \, t$$

where:

$P_d$ = power density in laser spot (watts/cm$^2$);
$r$ = material reflectivity;
$A_w$ = projected area of wire (cm$^2$);
$C_p$ = specific heat (joules/gm–°C);
$\zeta$ = density (gms/cm$^3$), and
$V_w$ = volume of illuminated area (cm$^3$).

Since, for a particular material, the only variable is the area/volume ratio in the latter equation, a reduction of this quantity will result in a decrease in the slope of the line $T_W$.

Figure 4:
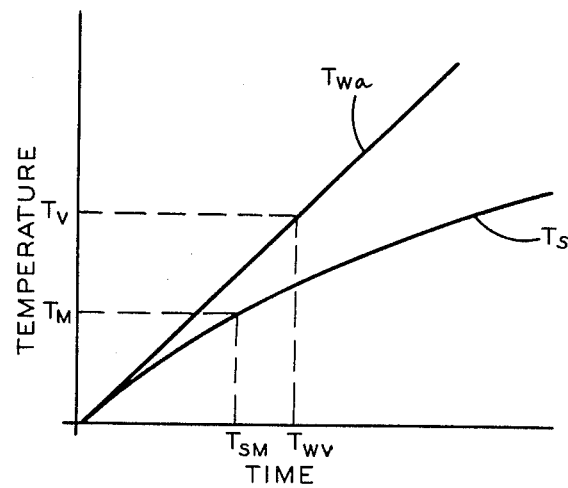
FIG. 4 is a graph of temperature rise characteristics similar to FIG. 3, illustrating the relationship between the substrate and the wire after the wire has been deformed in accordance with the present invention.

Thus, FIG. 4 illustrates the temperature characteristics of the end 14 of the wire 16 after the quantity $A_w/V$ has been reduced. The line $T_{wa}$ is seen to have a smaller slope than the corresponding line $T_W$ of FIG. 3. As a result, the time interval $T_{sm}$ is smaller than the time interval $T_{wv}$ and the zone 12 will melt before the wire end 14 vaporizes, thereby to provide a good fusion weld.

Figure 5:
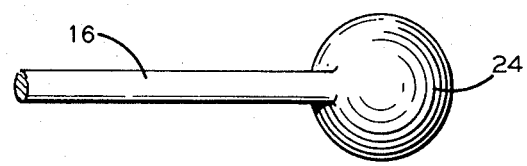
FIG. 5 is a perspective view of the deformed wire.

Thus, in accordance with the present method the end 14 of the wire 16 is deformed to decrease the area/volume ratio. In practice, the end 14 is first subjected to a laser beam to heat the end above the melting point. The end of the wire is then permitted to solidify whereby surface tension draws the melted portion into a sphere 24, as shown in FIG. 5. This reduces the area/volume ratio from $$A_w/V_w = \frac{ld}{\pi} \frac{d^2}{4} \, l = \frac{4}{\pi d}$$

(where $d$ = wire diameter and $\lambda$ = length of wire welded) for the normal wire to $$A_w/V_w = \frac{\pi r^2}{4/3 \pi r^3} = \frac{3}{2d'}$$

for the spherical end (where $r$ = radius of sphere and $d'$ = sphere diameter which is greater than the wire diameter).

Thereafter, the deformed end of the wire 16 is placed into contact with the contact zone 12 and the wire 16 and substrate 10 are subjected to the laser to heat both elements above their respective melting points. Thereafter, the elements are permitted to cool to provide a fusion weld. It should be noted that the diameter of the sphere may be made as large as necessary to provide a sufficient reduction in the area to volume ratio.

Accordingly, a method has been described for welding together a wire and a component wherein vaporization of the wire is substantially eliminated.

While a preferred method of the invention has been shown and described herein it will be obvious that numerous omissions, changes and additions may be made in such method without departing from the spirit and scope of the invention.

What is claimed is:

1. A method of connecting a wire to a component having a contact zone comprising heating a preselected portion of the wire to deform said portion to reduce the area-to-volume ratio of said wire to a point whereby the time to heat said portion to the vaporization point is increased beyond the time to melt said zone, placing said deformed portion in contact with said contact zone, and heating said deformed portion and said contact zone by means of a laser beam above their respective melting points to form a fusion weld.

2. The method of claim 1, in which said wire is heated by a laser beam above its melting point.

3. The method of claim 2, including the step of cooling said portion after heating the wire above the melting point, whereby surface tension draws said portion into a sphere.

4. The method of claim 1, in which said portion is heated above the melting point and below the vaporization point of the wire.

5. A method of connecting a wire to a substrate having a contact zone comprising deforming the end of said wire to raise the time to reach the vaporization point of the end substantially above the time to reach the melting point of said contact zone, placing said end in contact with said contact zone, and heating said end and said contact zone by a laser beam for an interval sufficient to raise the temperatures of said end and said zone above their respective melting points but insufficient to raise the temperature of said end above said vaporization point to provide a fusion weld between said wire and said substrate.

6. The method of claim 5, including the steps of deforming said end by heating said end above the melting point of said wire with a laser beam, and cooling said end whereby surface tension draws said end into a sphere.

7. The method of claim 5, including the further step of cooling said contact zone and said end to solidify said weld.

* * * * *